(12) United States Patent
Leconte et al.

(10) Patent No.: US 9,015,653 B2
(45) Date of Patent: Apr. 21, 2015

(54) AERONAUTICAL SOFTWARE APPLICATION DEVELOPMENT WORKBENCH COMPRISING A STRUCTURED FUNCTIONAL DESCRIPTION LANGUAGE

(75) Inventors: Hervé Leconte, Pessac (FR); Yannick Thiry, Biganos (FR); David Arneau, Pessac (FR)

(73) Assignee: Thales, Courbevoie (FR)

( * ) Notice: Subject to any disclaimer, the term of this patent is extended or adjusted under 35 U.S.C. 154(b) by 727 days.

(21) Appl. No.: 13/302,806

(22) Filed: Nov. 22, 2011

(65) Prior Publication Data

US 2012/0131548 A1    May 24, 2012

(30) Foreign Application Priority Data

Nov. 23, 2010  (FR) ..................... 10 04560

(51) Int. Cl.
  *G06F 9/44* (2006.01)
  *G06F 9/445* (2006.01)

(52) U.S. Cl.
  CPC ... *G06F 8/10* (2013.01); *G06F 8/38* (2013.01)

(58) Field of Classification Search
  None
  See application file for complete search history.

(56) References Cited

U.S. PATENT DOCUMENTS

2009/0309809 A1* 12/2009 Thiry et al. ..................... 345/1.3

OTHER PUBLICATIONS

Yannick Lefebvre, "Understanding ARINC 661 and the Benefits of 661-Based Development Tools", Presagis Whitepapers, URL:http://www.presagis.com/files/whitepapers/2006-06-WP-Arinc661-XT.pdf, Jun. 27, 2008, pp. 1-20, XP002659657.
Yannick Lefebvre, "A Flexible Solution to Deploy Avionics Displays to Multiple Embedded Platforms", AIAA 27th IEEE Digital Avionics System Conference, Oct. 26, 2008, pp. 5.A.3-1-5.A.3-9, IEEE, Piscataway, NJ, US, XP031372624.
"Esterel technologies Introduces SCADE ARINC 661 Solutions for Interactive Cockpit Displays Development", Esterel Technologies Press Release, URL:http://www.esterel-technologies.com/news-events/press-releases/2010/Esterel-Technologies-Introduces-SCADE-ARINC-661-Solution%20for-Interactive-Cockpit-Displays-Development, Oct. 13, 2010, pp. 1-4, XP002659658.
Eric Barboni et al., "Model-Based Engineering of Widgets, User Applications and Servers Compliant with ARINC 661 Specification", Interacgive Systems. Design, Specification, and Verification, Jul. 26, 2006, pp. 25-38, Springer Berlin Heidelberg, XP019076806.
Ronald Verhoeven, et al., "Prototyping Interactive Cockpit Applications", Digital Avionics Systems Conference, Oct. 24-28, 2004, pp. 9.A.3-1-9.A.3-10, vol. soft, XP010764917.

* cited by examiner

*Primary Examiner* — Qamrun Nahar
(74) *Attorney, Agent, or Firm* — Baker Hostetler LLP

(57) ABSTRACT

An aeronautical software application development workbench handling the production of a graphical human-machine interface on one or more display equipment systems comprises computer means processing software tools for creating, simulating or integrating graphical functions or "widgets" and logic functions for modifying the content of the graphical functions according to incoming events on the display equipment system or systems, said widgets being described in a file called "Definition File". The workbench includes a single graphical editor for designing the user application, the technical characteristic of which is to produce a structured language which describes each widget contained in the definition file and which associates consumed variables called "input plugs" with the modifiable attributes of said widget and produced variables called "output plugs" with the notifications of the events produced by said widget.

4 Claims, 3 Drawing Sheets

AERONAUTICAL SOFTWARE APPLICATION DEVELOPMENT WORKBENCH COMPRISING A STRUCTURED FUNCTIONAL DESCRIPTION LANGUAGE

CROSS-REFERENCE TO RELATED APPLICATION

This application claims priority to foreign French patent application No. FR 1004560, filed on Nov. 23, 2010, the disclosure of which is incorporated by reference in its entirety.

FIELD OF THE INVENTION

The field of the invention is that of the aeronautical software application development workbenches comprising an interactive graphical interface.

BACKGROUND

The modern aircraft cockpits include a set of interactive display devices for displaying, controlling and modifying all the parameters necessary to the piloting, navigation and more generally the accomplishment of the mission. The number of parameters to be managed is considerable and there are a multitude of possible graphical representations of these parameters.

The aeronautical software application is produced on a computer development workbench in a "PC" type computer environment. Currently, for many aeronautical applications, the definition of the human-machine interfaces, or "HMI", is governed by an aeronautical standard: ARINC 661. This standard specifies the interface between the display subsystem of a cockpit, or "CDS", standing for "Cockpit Display System", and the other avionics system equipment. It notably defines two external interfaces between the CDS and the systems of the aeroplane which are:
  The interface between the avionics equipment systems called user systems and the graphical display system or Client-server;
  The system behaviour of the displayable graphical elements.

The graphical part of the embedded HMIs of the aeronautical field are described in Definition Files (DF). The DFs describe the "widgets" that make up the HMI independently of their behaviour. A widget is a software unit associated with a graphical representation and a behaviour enabling the crew either to receive information, or, by means of a human-machine interface, to give instructions. From a software viewpoint, each widget offers technical interfaces of "click down", "click up", "change colour" and other such types, allowing for the production of events and for the modification of this widget. Their behaviour is coded in an application called "User Application" or "UA" which interacts with the widgets of the HMI through an ARINC 661 standardized exchange protocol. Thus, the HMI represents the state of the functional core of the UA.

The symbolic operation of the reciprocal exchanges between the User Application and the graphical server is represented in FIG. 1.

The complete process involved in developing an aeronautical software application is represented in FIG. 2 in the form of an uppercase V. This process comprises six steps which are:
  Specification step;
  Design step;
  Coding step;
  Verification or debugging step;
  Functional testing step;
  Final verification step.

Technically, the computer development workbench must satisfy the following main requirements:
  To design, implement and use a unified method for designing and developing HMIs of ARINC 661 type so as to:
    Reduce the recurrent development costs associated with different and non-unified development methods;
    Best re-use the HMI components.
  To formalize the interfaces between the functional core of the UA and the HMI in order to:
    Reduce the impacts of changes to the client specification or to the functional core on the HMI in terms of design and code.
  To design, implement and use a development platform or workbench offering the unified design and development capabilities of the ARINC 661 HMIs in order to:
    Deploy unified services;
    Unify the method by the use of the workbench which implements it;
    Reduce the design and manual coding activities.

Currently, the development of the aeronautical software applications involves the application of a conventional development process using manual code with different design methods depending on the projects. This development is represented in FIG. 3. It comprises three parts framed by dotted lines. The first frame contains the upstream specifications step, the second frame contains the functionalities of the development workbench, finally the third frame contains the implementation in the CDS.

Traditionally, the production by the development workbench of an avionics interactive graphical system is completed in two steps:
  Creation of the "static" aspect of the page using a graphics workbench, which can be used to place widgets on an HMI page and to define its initialization properties;
  Development in manual coding of the software of the processing logic, so that the content of the page can be modified according to incoming events.

The ARINC 661 HMI development activity consists in:
  Constructing the graphical HMI, that is to say using and organizing the ARINC 661 widgets according to the requirements of the upstream specification by conforming to the characteristics of the ARINC 661 widgets referenced in the manual code;
  Producing the Definition File.

The manual coding activity consists in:
  Implementing the requirements of the upstream specification in logic function terms;
  Producing the ARINC 661 command blocks corresponding to the state of the functional core by conforming to the ARINC 661 standard and to the characteristics of the ARINC 661 widgets of the "Definition File";
  Consuming the notifications of the ARINC 661 widgets of the "Definition File" by conforming to the ARINC 661 standard and to the characteristics of the ARINC 661 widgets of the Definition File;
  Transmitting the events to the functional core.

The direct consequences of this design method are that a modification of the requirements of the upstream specification relating to the functionality of the HMI directly impacts on the manual code with a strong risk of inconsistency with the "Definition File" and a modification of the requirements of the upstream specification relating to the graphics of the HMI impacts directly on the Definition File with a strong risk of inconsistency with the functionality of the HMI.

Ultimately, the drawbacks of the existing solutions are as follows:

- Changes to the graphical HMI directly impact on the design and the code of the interface between the HMI and the functional core of the UA and therefore entail additional activity on the descending part of the V of the development cycle as represented in FIG. 2;
- Changes to the interfaces of the functional core of the UA directly impact on the design and the code of the interface between the graphical HMI and the functional core and therefore entail additional activity on the descending part of the V of the development cycle;
- The coding activities entail additional test activity on the ascending part of the V of the development cycle;
- The ARINC 661 HMI developments are carried out according to methods specific to each project. There is no unified method and formalized structure for the ARINC 661 HMI developments;
- The complexity and the volume of the design and of the manual code cause HMI maintenance problems. The code is often modified directly and the design is modified a posteriori by reverse engineering.

SUMMARY OF THE INVENTION

The development workbench according to the invention does not present these drawbacks. The invention consists in implementing an integrated development workbench making it possible to produce ARINC 661 HMI controllers based on a structured functional description language.

More specifically, the subject of the invention is a method for implementing executable software in one or more display equipment systems, said method comprising:

a first step for production of said software by an aeronautical software application development workbench handling the production of a graphical human-machine interface on the display equipment system(s), said workbench comprising computer means processing software tools for creating, simulating or integrating graphical functions or "widgets" and logic functions for modifying the content of the graphical functions according to incoming events on the display equipment system or systems, said widgets being described in a file called "Definition File", a second step for installation of said software in said display equipment systems, characterized in that the workbench includes a single graphical editor for designing said executable software, said editor producing a structured language which comprises:

The definition of each widget contained in the Definition File;

The definition of the functional capabilities of said widgets:

By associating consumed variables called "input plugs" with the modifiable attributes of said widget, an "input plug" being a specific datum that can be used to dynamically modify one or more graphical attributes of said widget;

By associating produced variables called "output plugs" with the notifications of the events produced by said widget, an "output plug" being a datum signalling an equipment system state change request.

Advantageously, the developed software, the associated graphical functions and their functionalities conform to the ARINC 661 aeronautical standard.

Advantageously, the structured functional description language is implemented in a description language of "XML" type, XML being an acronym for "eXtended Markup Language".

Advantageously, the workbench also includes means for generating human-machine interface software handling the following functions:

translation of the functional description language into a programming language of C or C++ or ADA type;

activation of the flow control in the code generated by the use of the activation "input plugs" controlling the application of the ARINC 661 commands;

activation of the flow control in the code generated by the control of the modification of the "input plugs" associated with the modifiable attributes.

BRIEF DESCRIPTION OF THE DRAWINGS

The invention will be better understood and other advantages will become apparent from reading the following description given as a nonlimiting example and from the appended figures in which.

DETAILED DESCRIPTION

The present invention makes it possible to produce an ARINC 661 HMI on a software development workbench which:

offers a coherent and immediate view of the graphical and functional aspects;

correlates the construction of the HMI pages with the definition of their functional behaviour;

controls the flows originating from the functional logic;

translates this functional behaviour into structured language;

ensures the automatic production of code from the structured functional language.

Figure 1:
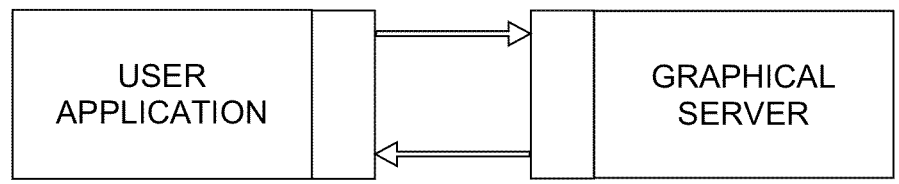
FIG. 1 represents the symbolic operation of a cockpit display system.
Figure 2:
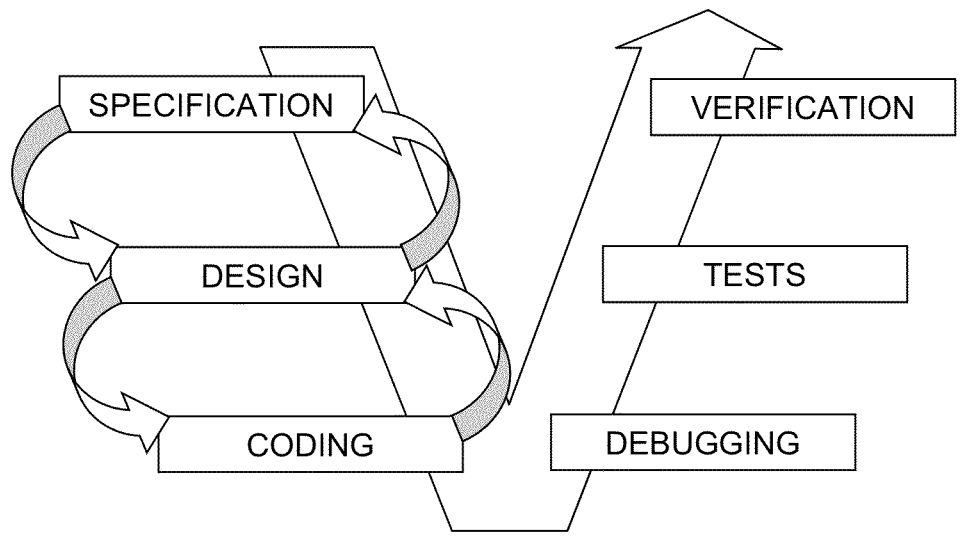
FIG. 2 represents the complete process of the development of an aeronautical software application in the form of an uppercase V.
Figure 3:
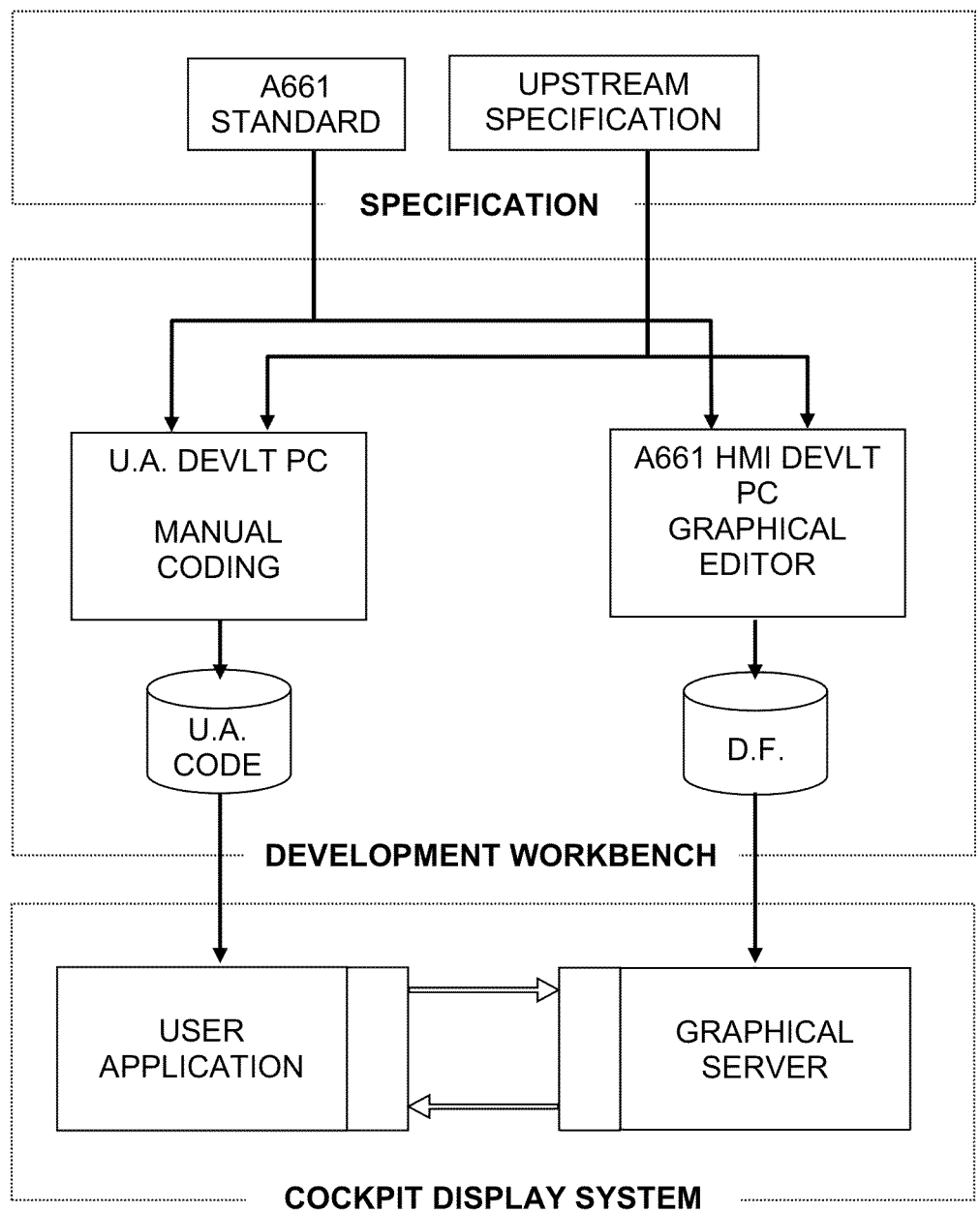
FIG. 3 represents the architecture of a development workbench according to the prior art.
Figure 4:
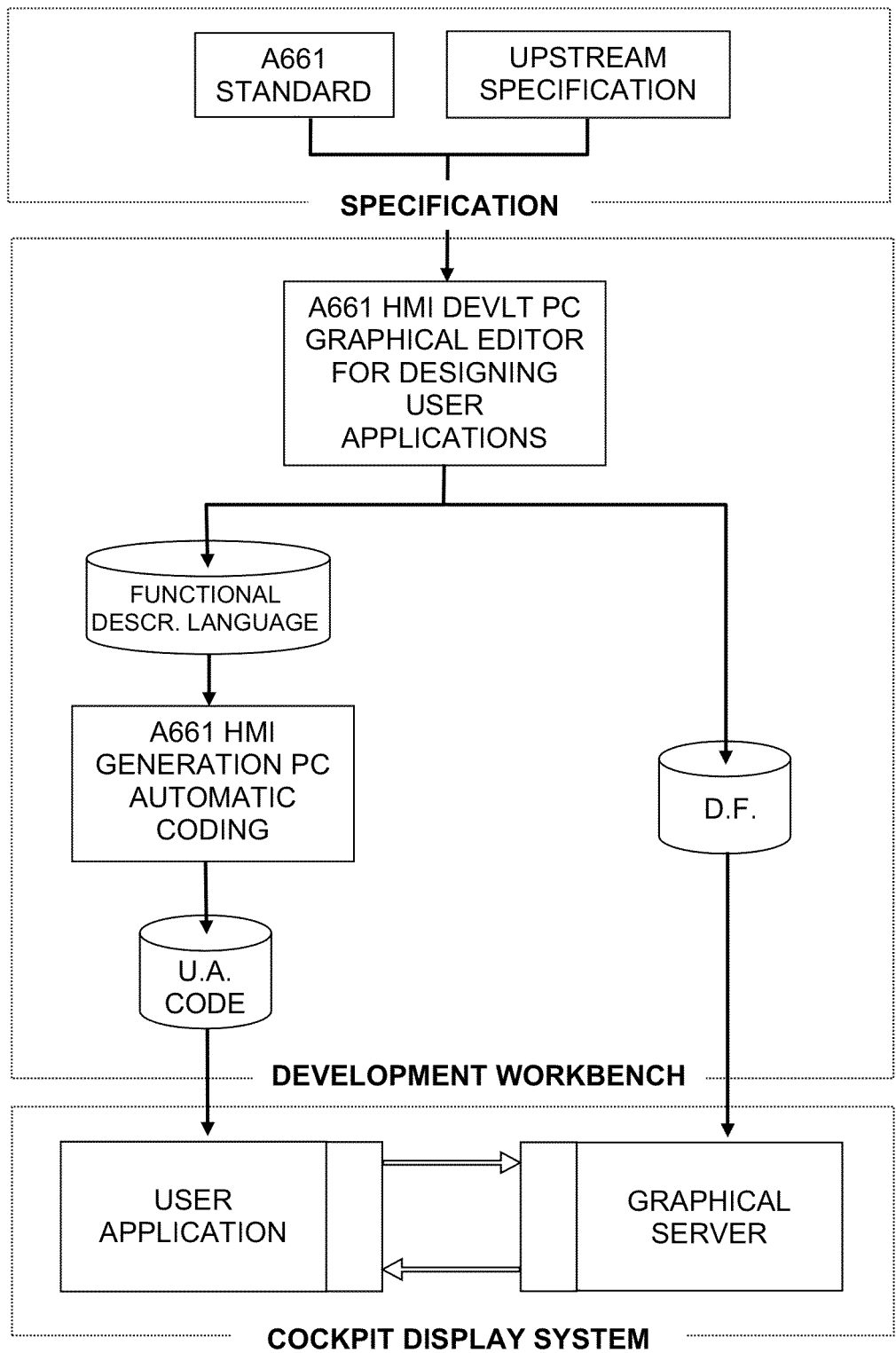
FIG. 4 represents the architecture of a development workbench according to the invention.

The development of the aeronautical software applications according to the invention is represented in FIG. 4. It comprises, as previously, three parts framed in dotted lines. The first frame contains the upstream specifications step, the second frame contains the functionalities of the development workbench and finally the third frame contains the installation in the CDS.

The architecture of the development workbench according to the invention is represented in the second frame of FIG. 4. The processing logic consists of a coherent HMI controller of the "static" aspect of the page interfacing with the functional logic. It should be noted that, for convenience, "PC" is used to designate the development computer hardware, which does not mean that the computer applications are necessarily implemented on physically separate, standalone hardware units. This means that the computer means implemented have a structure, a complexity and processing and storage capabilities similar to those of mass-produced personal computers.

The ARINC 661 HMI development PC denoted "A661 HMI DEVLT PC" in FIG. 4 can be used to:

Produce the graphical HMI by using and organizing the ARINC 661 widgets according to the requirements of the upstream specification. The graphical HMI includes the definition of the functional capabilities of the widgets. The consumed variables called "input plugs" are associated with the modifiable attributes of the widgets, an "input plug" being a specific datum making it possible to dynamically modify one or more graphical attributes of the widget;

Define the functional capabilities by associating produced variables called "output plugs" with the event notifications of the ARINC 661 widgets, an "output plug" being a datum signalling an equipment system state change request;

Define the functional capabilities in flow control terms.

As examples, an "input plug" named "RadioFrequency" corresponds to the text graphical attributes "102.4", the identifier of the graphical element "1,2,3". An "output plug" named "RadioFrequencyChanged" corresponds to the following state change request: COM1 radio activation and modification of the COM1 radiofrequency to the value "100.8".

The ARINC 661 HMI development PC conforms to the ARINC 661 standard and therefore ensures the consistency of the ARINC 661 interfaces of the widgets with the associated functional definitions. The variables consumed and produced are exchanged with the functional logic of the UA.

The ARINC 661 HMI development PC produces the functional description language. The functional description language is a structured language which describes:

Each ARINC 661 widget contained in the DF and having functional capabilities;

For each functional ARINC 661 widget, each of its modifiable attributes and the input plug that corresponds to it;

For each functional ARINC 661 widget, each of its events and the output plug that corresponds to it.

The functional description language is implemented in a description language of XML (eXtended Markup Language) type. This language is a generic markup computer language; it is used essentially to store/transfer structured unicode text type data in tree-structured fields. This language is "extensible" in that it enables the user to define tags of the elements.

The second ARINC 661 HMI generation PC denoted "A661 HMI GENERATION PC" in FIG. 4 handles:

The translation of the functional description language into programming language (C, C++, ADA, . . . );

The activation of the flow control in the code generated by use of the activation input plugs controlling the application of the ARINC 661 commands;

The activation of the flow control in the code generated by the control of the modification of the input plugs associated with the modifiable attributes.

The flow control on the "input plugs" allows for the execution of the code, an automatic and dynamic optimization of the modified technical parameters according to changes to the data specific to the job of the User Application. If a datum specific to the job is sent repeatedly with the same value, it does not cause the graphical attributes to be modified and if a datum specific to the job impacts on a number of graphical attributes, only those that change value are taken into account.

An exemplary structure of the functional description language in XML format is represented in Table 1 in the attached Appendix. It contains the conventional elements of the XML language such as the use of the chevrons < and > to identify the key words:

The main advantages of the development workbench according to the invention are:

Flexibility for change relative to the modifications of the ARINC 661 standard;

Coherent upgrading of the HMI and of the associated controller;

Independence of the definition of the controller with respect to the target language;

Reduction in the development activities associated with the use of an integrated development workbench eliminating the design and coding activities;

Deployment of the solution for the application of a unified development technique;

Re-use of the components in the context of the use of a unified solution.

APPENDIX

TABLE 1

```xml
<?xml version="1.0" encoding="UTF-8"?>
<functional_specification>
    <specification path="<path of the corresponding DF"/>
    <api_compat api_name="identifier of the A661 Norm API"/>
    <application_id value="UA identifier"/>
    <component name="..." widget_id="..."
    widget_name="..." widget_type="...">
        <layer name="..."/>
        <function name="..." user_defined="true|false">
            <signature>
                <parameter type="software type"/>
            </signature>
            <widget widget_id="..." widget_parameter="modifiable attribut name" widget_type="..."/>
            <input activation_variable="input plug name" mapping_type="software type" variable="input plug name"/>
        </function>
        <function>
        ...
        </function>
        ...
        <event type="notification type">
            <structure event_id="event identifier"/>
            <sources>
                <source widget_id="..." widget_type="..."/>
            </sources>
            <listener name="..." user_defined="true|false">
                <signature>
                    <parameter string_size="..."
                    type="software type"/>
                </signature>
                <event_flag variable="output plug"/>
            </listener>
        </event>
        <event>
        ...
        </event>
        ...
    </component>
</functional_specification>
```

The invention claimed is:

1. A method for implementing executable software in one or more display equipment systems, the method comprising: producing said executable software by an aeronautical software application development workbench handling production of a graphical human-machine interface on the one or more display equipment systems, said aeronautical software application development workbench comprising computer means processing software tools for creating, simulating, or integrating graphical functions or "widgets" and logic functions for modifying content of the graphical functions according to incoming events on the one or more display equipment systems, said widgets are described in a definition file; and installing said executable software in said one or more display equipment systems, wherein the aeronautical software application development workbench includes a single graphical editor for designing said executable software, said graphical editor producing a structured functional description language which includes a definition of each widget contained in the definition file;

a definition of functional capabilities of said widgets by associating consumed variables or "input plugs" with modifiable attributes of said widget, the "input plug" is a specific datum used to dynamically modify one or more graphical attributes of said widget; and by associating produced variables or "output plugs" with notifications of events produced by said widget, the "output plug" is a datum signaling an equipment system state change request.

2. A method for implementing executable software in one or more display equipment systems according to claim 1, wherein the executable software, the graphical functions and their functionalities conform to an ARINC 661 aeronautical standard.

3. A method for implementing executable software in one or more display equipment systems according to claim 1, wherein the structured functional description language is implemented in an XML (eXtended Markup Language) description language.

4. A method for implementing executable software in one or more display equipment systems according to claim 2, wherein the aeronautical software application development workbench further includes means for generating human machine interface software handling the following functions:

translating the structured functional description language into a programming language of C or C++ or ADA type;

activating flow control in code generated by using activation "input plugs" controlling application of ARINC 661 commands; and activating flow control in code generated by controlling modification of the "input plugs" associated with the modifiable attributes.

* * * * *